United States Patent
Mader et al.

(10) Patent No.: US 9,842,621 B1
(45) Date of Patent: Dec. 12, 2017

(54) HEAT-ASSISTED MAGNETIC RECORDING APPARATUS CAPABLE OF DETECTING OPTICAL POWER CHANGE BASED ON ONE OR MORE OF PHASE ERRORS AND DIBIT RESPONSE

(71) Applicant: Seagate Technology LLC, Cupertino, CA (US)

(72) Inventors: Drew Michael Mader, Minneapolis, MN (US); Tim Rausch, Farmington, MN (US); James E. Angelo, Savage, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/246,835

(22) Filed: Aug. 25, 2016

(51) Int. Cl.
| | |
|---|---|
| G11B 11/00 | (2006.01) |
| G11B 20/10 | (2006.01) |
| G11B 20/18 | (2006.01) |
| G11B 5/012 | (2006.01) |
| G11B 7/126 | (2012.01) |
| G11B 5/00 | (2006.01) |
| G11B 7/1267 | (2012.01) |
| G11B 7/1263 | (2012.01) |
| G11B 5/60 | (2006.01) |
| G11B 11/105 | (2006.01) |

(52) U.S. Cl.
CPC .......... *G11B 20/105* (2013.01); *G11B 5/012* (2013.01); *G11B 7/126* (2013.01); *G11B 20/1816* (2013.01); *G11B 5/6088* (2013.01); *G11B 7/1263* (2013.01); *G11B 7/1267* (2013.01); *G11B 11/1051* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,182,682 A | 1/1993 | Weispfenning et al. | |
| 5,625,506 A * | 4/1997 | Dovek | G11B 20/1403 360/51 |
| 7,969,826 B2 | 6/2011 | Naniwa et al. | |
| 8,570,842 B1 * | 10/2013 | Richter | G11B 5/314 360/29 |
| 8,913,341 B1 * | 12/2014 | Jury | G11B 20/10046 360/39 |
| 8,937,783 B2 | 1/2015 | Albrecht et al. | |
| 9,153,272 B1 * | 10/2015 | Rausch | G11B 7/1267 |
| 9,311,951 B1 | 4/2016 | Chu et al. | |
| 9,525,576 B1 * | 12/2016 | Patapoutian | H04L 27/148 |
| 9,595,288 B1 * | 3/2017 | Chu | G11B 7/1267 |
| 9,613,652 B2 * | 4/2017 | Link | G11B 20/1024 |

(Continued)

OTHER PUBLICATIONS

File History for U.S. Appl. No. 15/347,129.

*Primary Examiner* — Tan X Dinh
(74) *Attorney, Agent, or Firm* — Hollingsworth Davis, LLC

(57) ABSTRACT

An apparatus determines that phase errors have exceeded a threshold when reading data previously recorded to a heat-assisted recording medium. In response to the phase errors exceeding the threshold, remedial action is taken to prevent loss of data due changes in power applied to heat the heat-assisted recording medium when recording.

20 Claims, 6 Drawing Sheets

(56) References Cited

U.S. PATENT DOCUMENTS

| | | | |
|---|---|---|---|
| 2010/0027149 A1* | 2/2010 | Boonyurn | G11B 27/36 360/31 |
| 2011/0035634 A1* | 2/2011 | Blaum | G06F 11/1068 714/704 |
| 2013/0163111 A1 | 6/2013 | Albrecht et al. | |
| 2014/0192435 A1 | 7/2014 | Buch | |
| 2015/0279430 A1 | 10/2015 | Trantham et al. | |
| 2015/0332725 A1 | 11/2015 | Rausch et al. | |
| 2016/0104514 A1 | 4/2016 | Burnett et al. | |
| 2016/0307590 A1 | 10/2016 | Yang et al. | |
| 2017/0092318 A1 | 3/2017 | Chu et al. | |
| 2017/0162222 A1 | 6/2017 | Matousek et al. | |

* cited by examiner

HEAT-ASSISTED MAGNETIC RECORDING APPARATUS CAPABLE OF DETECTING OPTICAL POWER CHANGE BASED ON ONE OR MORE OF PHASE ERRORS AND DIBIT RESPONSE

SUMMARY

The present disclosure is directed to a detecting optical power changes in a heat-assisted media recording apparatus. In one embodiment, it is determined whether or not phase errors have exceeded a threshold when reading data previously recorded to a heat-assisted recording medium. In response to the phase errors exceeding the threshold, remedial action is taken to prevent loss of data due changes in power applied to heat the heat-assisted recording medium when recording.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein may use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into the optical spot in a recording layer. The hotspot raises the media temperature locally, reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

This disclosure describes techniques used to adapt to changes in optical power used to heat the HAMR recording medium. It has been found that, over time, the amount of power at the hotspot can vary sufficiently such that quality of the recorded data can begin to degrade. This degradation may be due to changes in the laser, the optical path that delivers light to the recording medium, and/or other changes (e.g., changes that affect head-to-media spacing, contamination of the media-facing surface of the head). The degradation may be due to the optical power that heats the recording medium being too low or too high. The degradation may be found soon after writing, e.g., verification of the written data, or some longer time thereafter, e.g., when the data is read back by the host. In either event, a procedure may be performed to mitigate any data loss that may occur due to the change in laser power.

Figure 1:
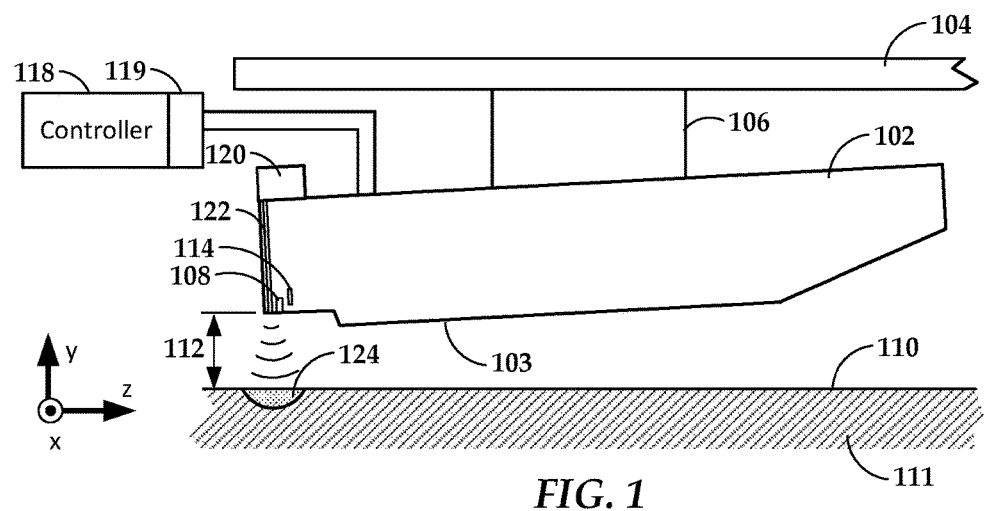
FIG. 1 is a view of a slider assembly according to an example embodiment.

In FIG. 1, a block diagram shows a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
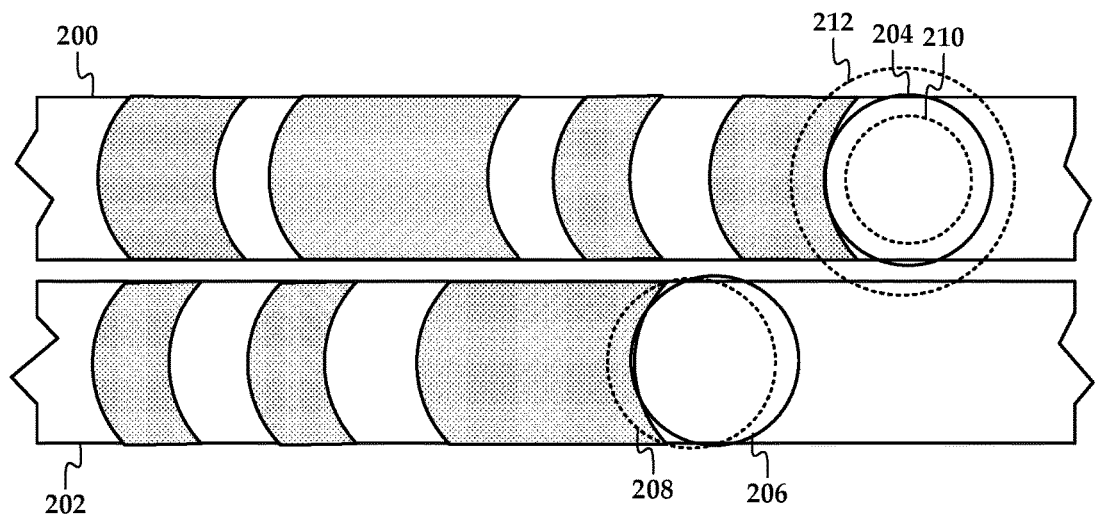
FIG. 2 is a diagram of recorded tracks according to an example embodiment.

Small changes in the laser's power can have significant effects on the recording process, and these effects may be seen in both the downtrack and crosstrack direction of the data tracks. An example of this is shown in the diagram of FIG. 2, which shows two adjacent tracks 200, 202 according to an example embodiment. The different shaded areas in the tracks 200, 202 represent regions of different magnetic orientation. Circles 204, 206 represent a nominal hotspot size on the tracks 200, 202, e.g., a hotspot size that is optimal given the desired track width and linear bit density of the tracks 200, 202. When a laser's power increases rather abruptly (sometimes called a mode hop) the thermal profile of the spot size sent to the media may increase or shift, causing the written transition to occur earlier than expected. The spot size of the profile is thought to be constant in some cases. This case is represented by dashed circle 208, which indicates a momentary downtrack shift due to mode hopping relative to the nominal hotspot 206. This is one example of a downtrack effect.

Downtrack effects may also occur when the laser's power decreases or increases thereby affecting the size of the hotspot. In such a case, the written transition is written later or earlier than expected because the thermal profile of the spot size has changed. This is indicated by dashed circles 210, 212, which indicate a hotspot at respective lower and higher values than nominal 204. These variations 210, 212 can also result in crosstrack effects, such as increasing chances of encroachment when the hotspot is too big, and making the track too narrow when the hotspot is too small. In the latter case, the field strength of the bits may be too weak for reliable data storage and retrieval. Both of these crosstrack effects can lead to degradation in the form of increase bit error rate (BER) on the written track and/or neighboring tracks.

As noted above, the downtrack effects can cause a shift in the written bit transitions. Where the shift is constant over a large number of bits (e.g., hotspot too big or too small for a long period of time), this may be observed as a shift relative to a locational reference point, such as servo marks written on the recording medium during manufacture, or the expected bit location. This shift may be evenly applied to all transitions within the data sectors, however, and so may only be detected at the start of the data sector. For more randomly occurring events, such as laser mode hopping, the shifts may be randomly distributed within the data sectors.

Figure 3:
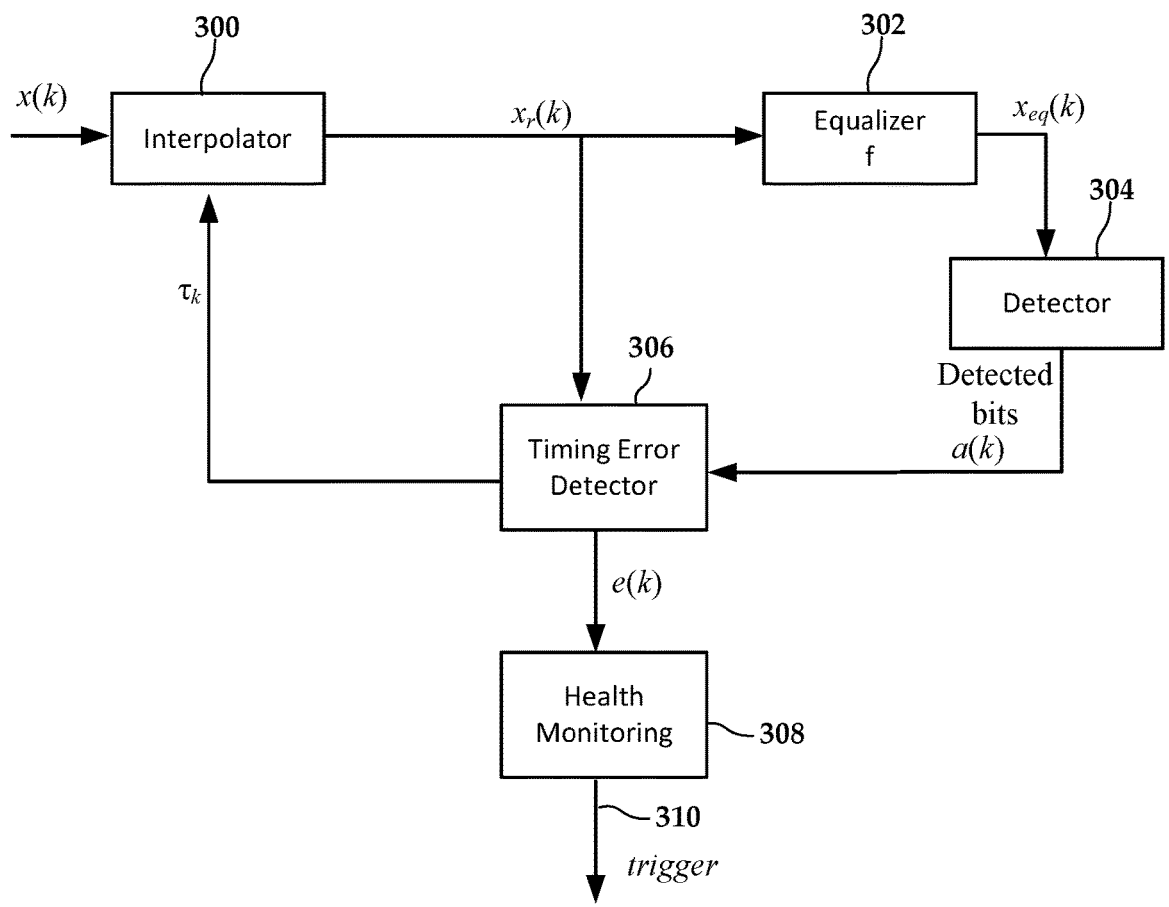
FIG. 3 is a block diagram of a timing recovery loop according to an example embodiment.

The read channel includes a timing recovery loop that detects and corrects written in phase errors. The timing corrections are subsequently fed forward to the adaptive channel so as to ensure it is sampling the data at the optimum time. In FIG. 3, a block diagram illustrates a simplified timing recovery loop according to an example embodiment. Incoming digital samples x(k) are processed by an interpolator 300 that estimates a continuous function based on the discrete samples and performs timing correction. The outputs of the interpolator 300 are timing-corrected samples $x_r(k)$ that are processed by an equalizer 302 to compensate for the channel impulse response. The equalized output $x_{eq}(k)$ is input to a detector 304. The detected bits $\alpha(k)$ are fed back to a timing error detection block 306, which provides a corrective phase shift $\tau_k$, which is input to the interpolator 300 for performing the timing adjustment.

As mentioned before, when the laser's power changes, the transitions written to the media are shifted by some amount, and the shift can be positive or negative. As the channel adapts to these errors it outputs a metric e(k) based on how far off the timing of the written transition is relative to where it is expected to be. For example, if optical power increases, the sign of channel's metric e(k) would be negative because the transition was written earlier than expected. On the other hand, when the laser's power decreases, and the transitions is written latter than expected and the sign of the output metric e(k) would be positive. This data is used by a health monitor 308 that can take remedial action as described herein below.

The health monitor 308 utilizes knowledge of the downtrack and crosstrack effects when a laser experiences a change in power to protect user data. For example, if very large negative phase errors are detected when reading a center track, this suggests an increase in power from the laser. This could lead to performance loss on said center track as well as on adjacent tracks. Therefore, the health monitor 308 can trigger 310 remedial action to ensure those tracks do not become unrecoverable. For example, during a normal user read or during background activity reads, if a certain number of phase errors' signs are negative above a threshold (suggesting a laser power increase and therefore potential BER degradation on adjacent tracks) the health monitor trigger 310 could be used to take some proactive active to ensure that the neighboring tracks will not be corrupted in the future. The thresholds and actions may be defined within the storage device firmware, and/or the thresholds may be host-defined, and remedial actions may be initiated by the host.

Depending on the severity of the potential encroachment (e.g., the magnitude of the phase error) the host and/or storage device could intelligently adjust the Direct Offline Scan (DOS) process and/or DOS counters. The DOS process will cause the periodic refreshing of track data when its neighboring tracks have been written too often. The DOS counters for a specific track monitor the number of times neighboring tracks are written. For example, the DOS counters for Track Y record how often Tracks Y−N and Tracks Y+N, where N is a number of tracks, were written and are therefore a metric of the possible degradation of Track Y. If these DOS counters exceed some threshold, Track Y is scrubbed (e.g., read into a buffer and rewritten from the buffer to ensure the track can be read later).

In the above example, if a track is written and on read-back the phase errors are −X %, with the DOS counters on its N neighboring tracks may be increased by some value, possibly weighted by the severity of the phase errors as well as well as the distance away from the track, i.e. N. In another embodiment, the DOS counters on the neighboring tracks could be set to the maximum value to ensure the tracks are read and rewritten as soon as there is idle time. This could be extended to two or more tracks away from the affected track in either direction. The DOS counters on the adjacent tracks could be incremented asymmetrically depending on drive factors (e.g., the adjacent track interference profile of the drive). The adjacent track interference profile is a metric of how much BER loss will occur on a neighboring track when a center track is written. Often times the BER loss on Track −1 and Track +1 will be different depending on where the track is on the disk (e.g., OD vs. ID) and well as what head is being used. Therefore the ATI profile is head unique and could provide an inference of how to adjust the DOS counter. For example, if more degradation is seen on the OD track than the ID track, the DOS counters may not need much adjustment on the ID track. If large positive phase errors are detected (which suggests a laser power decrease) the DOS counters on the current track could be increased (possibly to the maximum value), as it is possible the track was written poorly.

As noted above, laser mode hopping can result in down-track shifting of the bit transitions. In some cases, mode hopping can also shift the hotspot in the cross track direction, resulting in tracks written off-center relative to the servo marks that define the track locations. Off-center HAMR writing can also be due to other causes, such as degradation of the near-field transducer. In another embodiment, the read channel can be adapted to provide a measure of how far off center a track was written. One way of measuring this is to use the dibit response in the channel: based on analysis of the dibit response one can extract how far off track a write occurred. Depending on this, in possible combination with the sign and magnitude of the phase errors, the DOS counters on the center track and/or adjacent tracks can be changed accordingly.

Figure 4A:
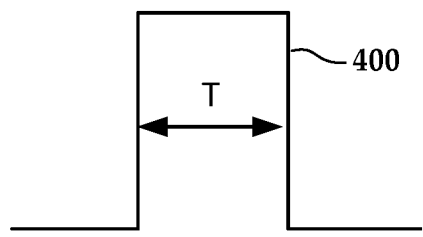
FIGS. 4A and 4B are diagrams of a dibit and dibit response used in a method and apparatus according to an example embodiment.
Figure 4B:
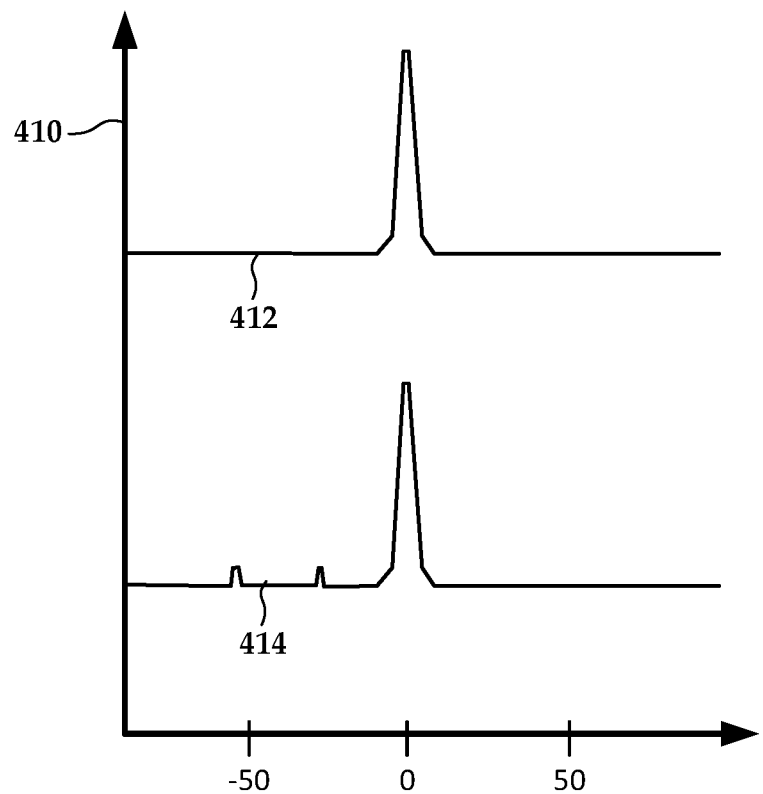

In FIGS. 4A and 4B, diagrams show an example dibit and dibit response that may be used in determining a track being off-center. A dibit 400 as seen in FIG. 4A includes two transitions, which includes two transitions separated by a bit period T. Channel response to the dibit, as shown in graph 410 of FIG. 4B, provides information on various distortions in the system. For example, trace 412 represents a relatively clean dibit response. Trace 414 includes additional "side peaks," that among other things, can indicate how off center a track was written.

Figure 5:
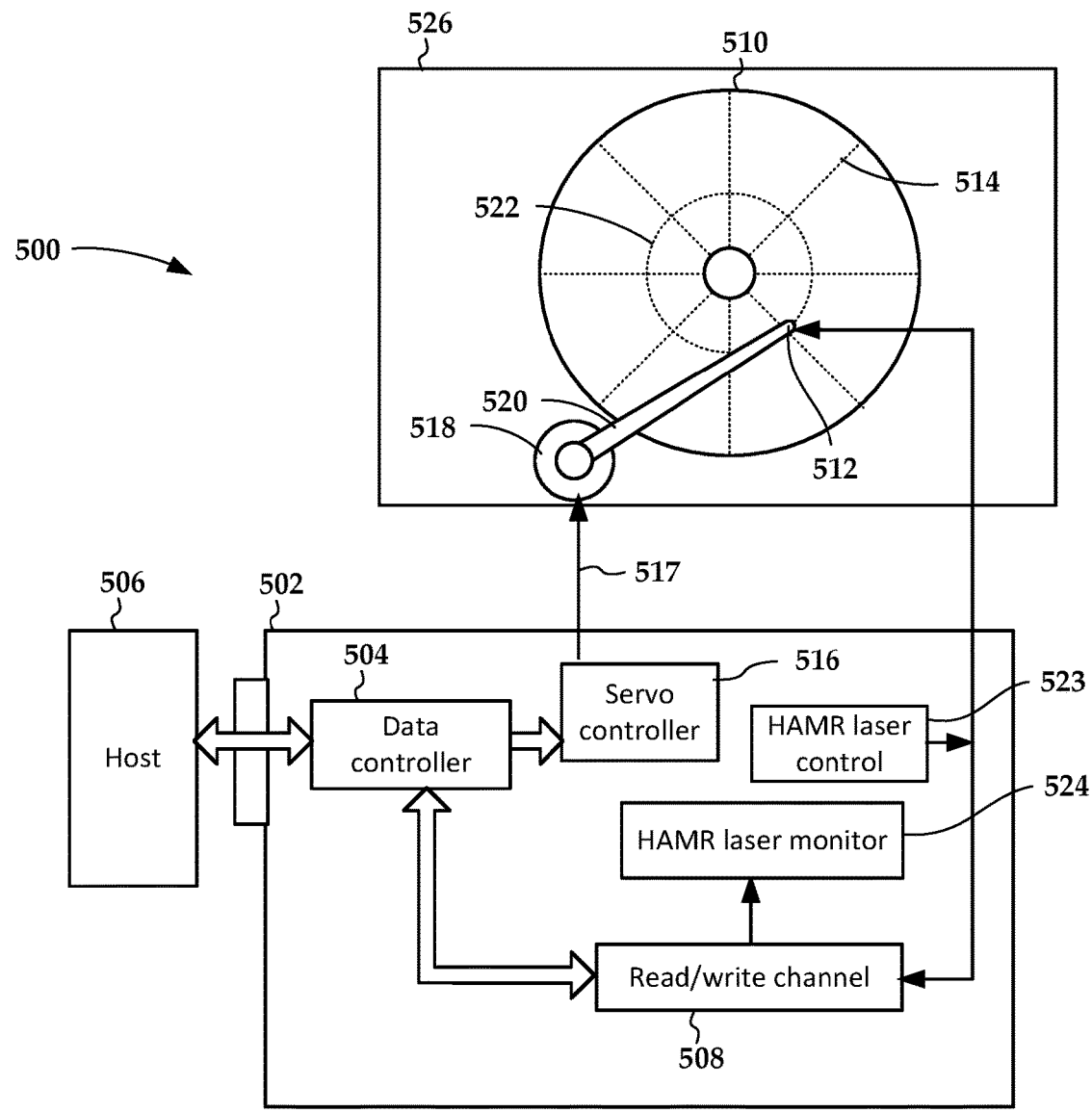
FIG. 5 is a block diagram of an apparatus according to an example embodiment.

In FIG. 5, a block diagram illustrates a hard disk drive 500 according to an example embodiment. Control logic circuit 502 of the drive 500 includes a data controller 504 that processes read and write commands and associated data from a host device 506. The host device 506 may include any electronic device that can be communicatively coupled to store and retrieve data from a data storage device, e.g., a computer, peripheral card, etc. The data controller 504 is coupled to a read/write channel 508 that reads from and writes to a surface of a magnetic disk 510.

The read/write channel 508 generally converts data between the digital signals processed by the data controller 504 and the analog signals conducted through one or more read/write heads 512 during read operations. To facilitate the read operations, the read/write channel 508 may include analog and digital circuitry such as preamplifiers, filters, decoders, digital-to-analog converters, timing-correction units, etc. The read/write channel 508 also provides servo data read from servo wedges 514 on the magnetic disk 510 to a servo controller 516. The servo controller 516 uses these signals to provide a voice coil motor control signal 517 to a VCM 518. The VCM 518 rotates an arm 520 upon which the read/write heads 512 are mounted in response to the voice coil motor control signal 517.

Data within the servo wedges 514 is used to detect the location of a read/write head 512 relative to the magnetic disk 510. The servo controller 516 uses servo data to move a read/write head 512 to an addressed track 522 and block on the magnetic disk 510 in response to the read/write commands (seek mode). While data is being written to and/or read from the disk 510, the servo data is also used to maintain the read/write head 512 aligned with the track 522 (track following mode).

The disk drive 500 uses HAMR, and therefore the read/write heads 512 include an energy source (e.g., laser diode) that heats the magnetic disk 510 when recording. A HAMR laser control block 523 sends a current to activate the lasers when recording. To assist in detecting and compensating for variations in the application of heat to the disk, a HAMR laser monitor 524 collects data processed via the read channel 508, the data being indicative that the hot spot is out of location and/or mis-sized due to optical degradation or other changes that can affect the hot spot (e.g., flying height, contamination at the air-bearing surface, etc.). The data gathered by the HAMR laser monitor 524 may at least include magnitude and direction of phase errors, as well as dibit response. The HAMR laser monitor 524 can provide triggers used by the controller 504 and/or host 506. The controller 504 and/or host 506 can use these triggers to mitigate the effects of the optical degradation.

Figure 6:
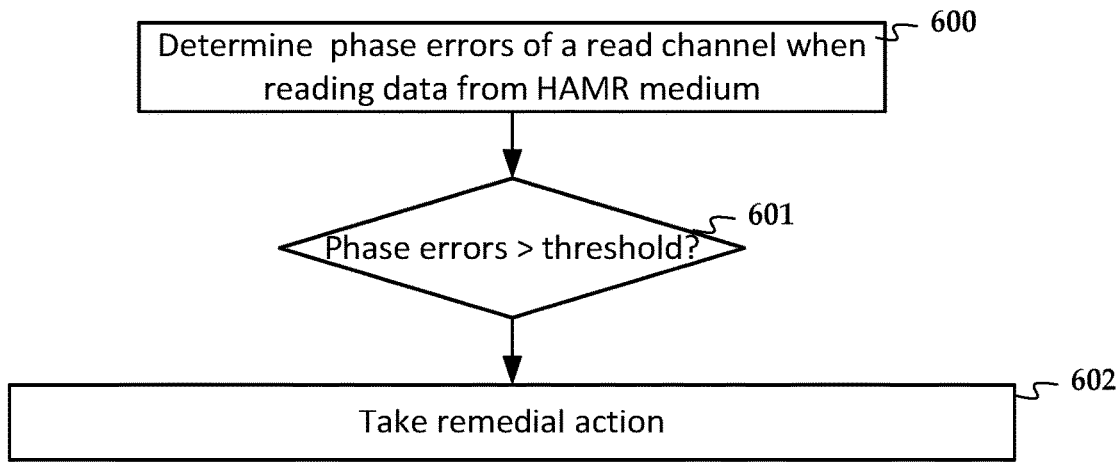
FIGS. 6-8 are flowcharts of methods according to example embodiments.

In reference now to FIG. 6, a flowchart illustrates a method according to an example embodiment. The method involves determining 600 phase errors of a read channel (e.g., magnitude and direction of the phase errors) when reading data previously recorded to a heat-assisted recording medium. If it is determined 601 that the phase errors have exceeded a threshold, remedial action 602 is taken to prevent loss of data (e.g., adjacent track erasure, tracks written too narrowly) due to changes in power applied to the heat-assisted recording medium when recording or the location of the hotspot.

Figure 7:
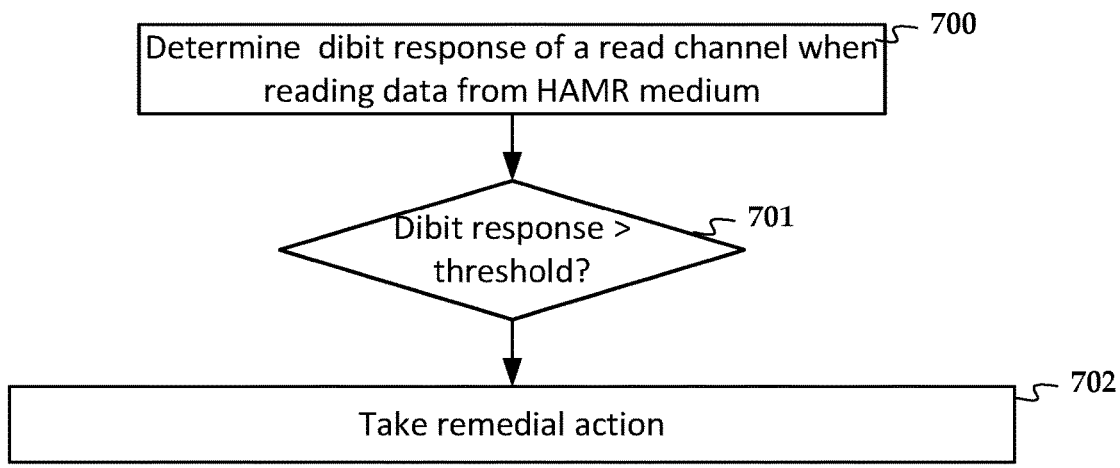

In reference now to FIG. 7, a flowchart illustrates a method according to another example embodiment. The method involves determining 700 a dibit response of a read channel when reading data previously recorded to a heat-assisted recording medium. If it is determined 701 that the dibit response has exceeded a threshold, remedial action 702 is taken to prevent loss of data (e.g., adjacent track erasure, tracks written too narrowly) due to changes in power applied to the heat-assisted recording medium when recording or the location of the hotspot.

Figure 8:
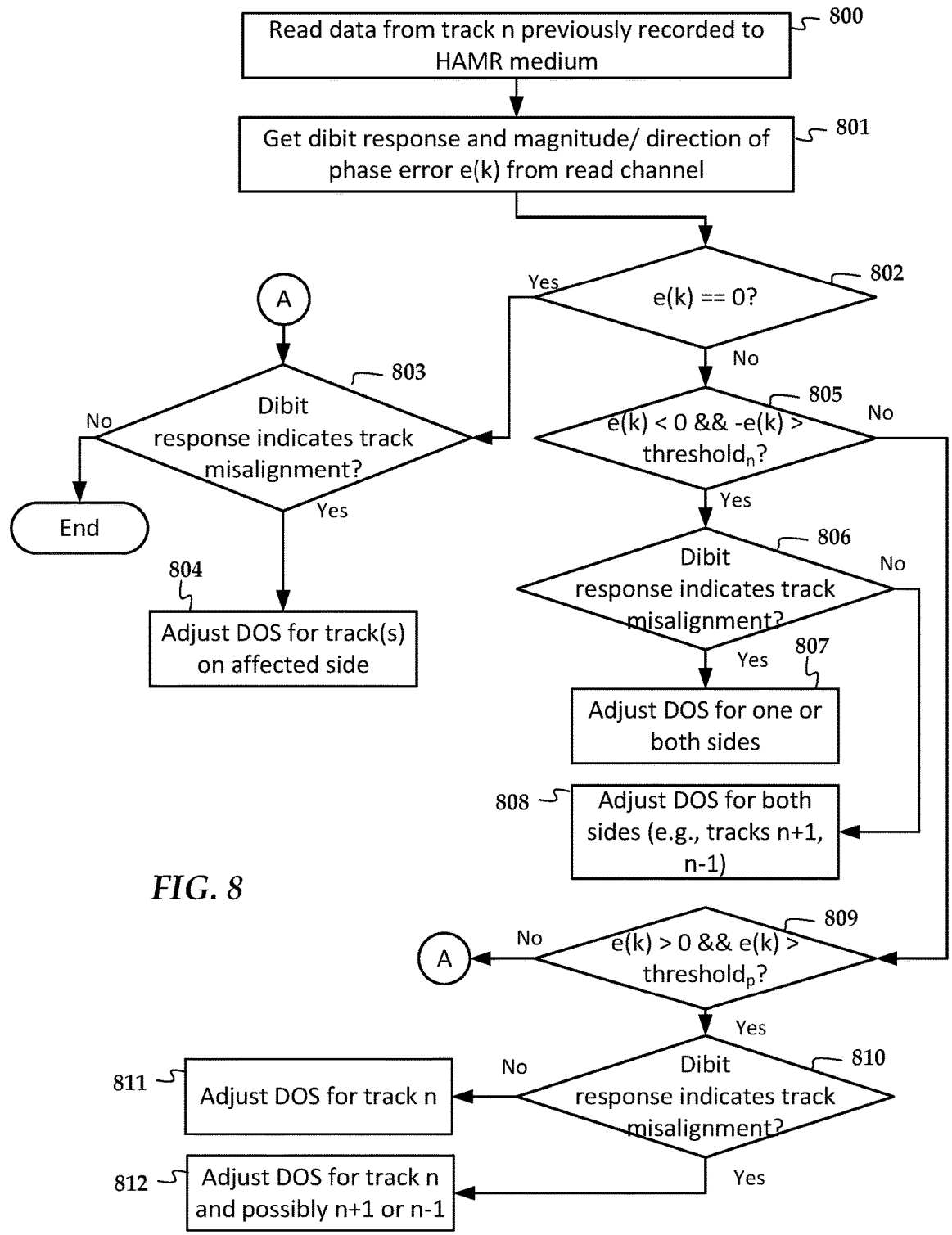

In FIG. 8, a flowchart illustrates a method according to another example embodiment. When a track previously recorded to a HAMR medium is read 800 (e.g., user data read, background scan), a dibit response together with magnitude and direction of phase error is determined 801. If the phase error is determined 802 to be zero (or below some threshold), the dibit response is checked 803 to determine if there is significant track misalignment. If misalignment is found, the DOS counters are adjusted 804 for one or more adjacent tracks on the affected side.

If determination at block 805 is that the phase errors are negative and the magnitude is greater than a first threshold (hot spot is too big), then another determination 806 as to whether dibit response indicates track misalignment is performed. If the dibit response exceeds some threshold, then possibly N tracks on either side of the affected track could have their DOS counters adjusted. The amount of the adjustment for each track and the number of tracks adjusted may depend on respective values of phase errors, dibit response, and the number of tracks (N) away from the track being read.

If determination at block 809 is that the phase error is positive and magnitude is greater than a second threshold (hot spot is too small), then another determination 810 is made as to whether dibit response indicates track misalignment. If so, then possibly one or more adjacent tracks of the affected track may have the DOS counters adjusted 812 depending on respective values of phase error and dibit response. Otherwise just the affected track has DOS adjusted 811.

It will be understood that other remedial action may be taken instead of or in addition to what is shown in FIG. 8. For example, if the hotspot is too large or too small, a calibration may occur in which test tracks are written at different laser power levels and a new nominal laser power level selected. This may also involve adjusting other parameters, such as fly height or head temperature. If the tracks are misaligned, then servo adjustment values may be used to compensate for the offset when recording tracks. These adjustments could be on the read and or writing of tracks. This may be done instead of or in addition to the adjustment of DOS.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   determining that a magnitude of a phase error has exceeded a threshold when reading data previously recorded to a heat-assisted recording medium; and
   in response to the magnitude of the phase error exceeding the threshold, taking remedial action to prevent loss of data due changes in optical power applied to heat the heat-assisted recording medium when recording, the remedial action being different depending on whether a direction of the phase error is positive or negative.

2. The method of claim 1, wherein the change of optical power applied to the laser results in interference with adjacent tracks.

3. The method of claim 1, wherein the remedial action includes adjusting a counter of adjacent track writes associated with a track, the track being rewritten when the counter exceeds a threshold, the adjusting of the counter causing the track to be rewritten sooner.

4. The method of claim 3, wherein the track is adjacent to another track that exhibited the phase errors.

5. The method of claim 3, wherein the track exhibits the phase errors.

6. The method of claim 3, wherein the counter is adjusted further based on a profile that indicates susceptibility of the track to adjacent track interference.

7. The method of claim 1, wherein the magnitude of the phase errors exceeding the threshold is indicative of a change in size of a hotspot applied to the heat-assisted recording medium when recording the data, wherein a first direction of the phase error indicates the hotspot is too small, and a second direction of the phase error indicates the hotspot is too large.

8. The method of claim 1, wherein the magnitude of the phase errors exceeding the threshold is indicative of a change in relative position of a hotspot applied to the heat-assisted recording medium when recording the data.

9. The method of claim 1, further comprising measuring a dibit response when reading the data previously recorded to the heat-assisted recording medium, wherein the remedial action further takes into account the dibit response together with the magnitude and direction of the phase errors.

10. A method comprising:
    determining a dibit response of data of a track previously recorded to a heat-assisted recording medium;
    determining that the dibit response has side peaks that exceed a threshold; and
    in response to the side peaks of the dibit response exceeding the threshold, taking remedial action to prevent loss of data of the track due changes in power applied to heat the heat-assisted recording medium when recording.

11. The method of claim 10, wherein the side peaks of the dibit response exceeding the threshold is indicative of a change in relative position of a hotspot applied to the heat-assisted recording medium when recording the data.

12. The method of claim 10, further comprising measuring phase errors when reading the data previously recorded to the heat-assisted recording medium, wherein the remedial action further takes into account a magnitude and direction of the phase errors together with the dibit response.

13. An apparatus comprising:
    a read channel configured to determine an indicator of a change in power applied to previously record a track to a heat-assisted recording medium, the indicator determined when reading data from the track, the indicator comprising a dibit response and a magnitude of a phase error; and
    a controller coupled to the read channel and configured to perform a remedial action to prevent loss of data in response to the indicator exceeding a threshold, the remedial action being different depending on whether the dibit response indicates a track misalignment.

14. The apparatus of claim 13, wherein the change of power applied to previously record the track results in interference with adjacent tracks.

15. The apparatus of claim 13, wherein the remedial action includes adjusting a counter of adjacent track writes associated with the track, the track being rewritten when the counter exceeds a threshold, the adjusting of the counter causing the track to be rewritten sooner.

16. The apparatus of claim 15, wherein the track is adjacent to another track that exhibited the indicator exceeding the threshold.

17. The apparatus of claim 15, wherein the track exhibits the indicator exceeding the threshold.

18. The apparatus of claim 13, wherein the indicator exceeding the threshold is indicative of at least one of a change in size and relative position of a hotspot applied to the heat-assisted recording medium when recording the data.

19. The apparatus of claim 13, further comprising a host interface coupled to the controller, wherein the indicator is communicated to the host via the host interface, and wherein the remedial action is performed by the host via the controller and host interface.

20. The apparatus of claim 13, wherein the remedial action takes into account the dibit response together with the magnitude and a direction of the phase errors.

* * * * *